United States Patent [19]

Lodewijk

[11] Patent Number: 5,107,630

[45] Date of Patent: Apr. 28, 1992

[54] ABRASIVE BLASTING APPARATUS

[75] Inventor: Jacob K. Lodewijk, Oosterhout, Netherlands

[73] Assignee: L.T.C. International B.V., Oosterhout, Netherlands

[21] Appl. No.: 578,724

[22] Filed: Sep. 6, 1990

[30] Foreign Application Priority Data

Sep. 7, 1989 [NL] Netherlands .................. 8902245

[51] Int. Cl.⁵ .......................... B24C 3/06; B24C 9/00
[52] U.S. Cl. ...................................... 51/410; 51/438;
51/436; 51/425
[58] Field of Search ................. 51/424, 425, 436, 439,
51/438, 273, 426, 410, 429

[56] References Cited

U.S. PATENT DOCUMENTS

| | | | |
|---|---|---|---|
| 1,953,311 | 4/1934 | Peik | 51/439 |
| 2,597,434 | 5/1952 | Bishop et al. | 51/425 |
| 2,810,991 | 10/1957 | Mead et al. | 51/425 |
| 3,916,568 | 11/1975 | Rose et al. | 51/429 |
| 4,045,915 | 9/1977 | Gilbert et al. | 51/429 |

Primary Examiner—Robert A. Rose
Attorney, Agent, or Firm—Wells, St. John & Roberts

[57] ABSTRACT

An apparatus for blasting a surface (S) with granular material, which apparatus consists substantially of a feed tank (1) for the material, a blasting head (4), a separator device (5) for separating removed dust and granular material, a filter device (9) and a conduit system connecting the tank, the blasting head and the devices, in addition to a vacuum generator (11) arranged behind the filter system for generating a pressure difference over each part of the apparatus, wherein a lock member (20) for feeding dust and/or granular material is arranged in a dividing wall of a device and the surrounding environment.

10 Claims, 4 Drawing Sheets

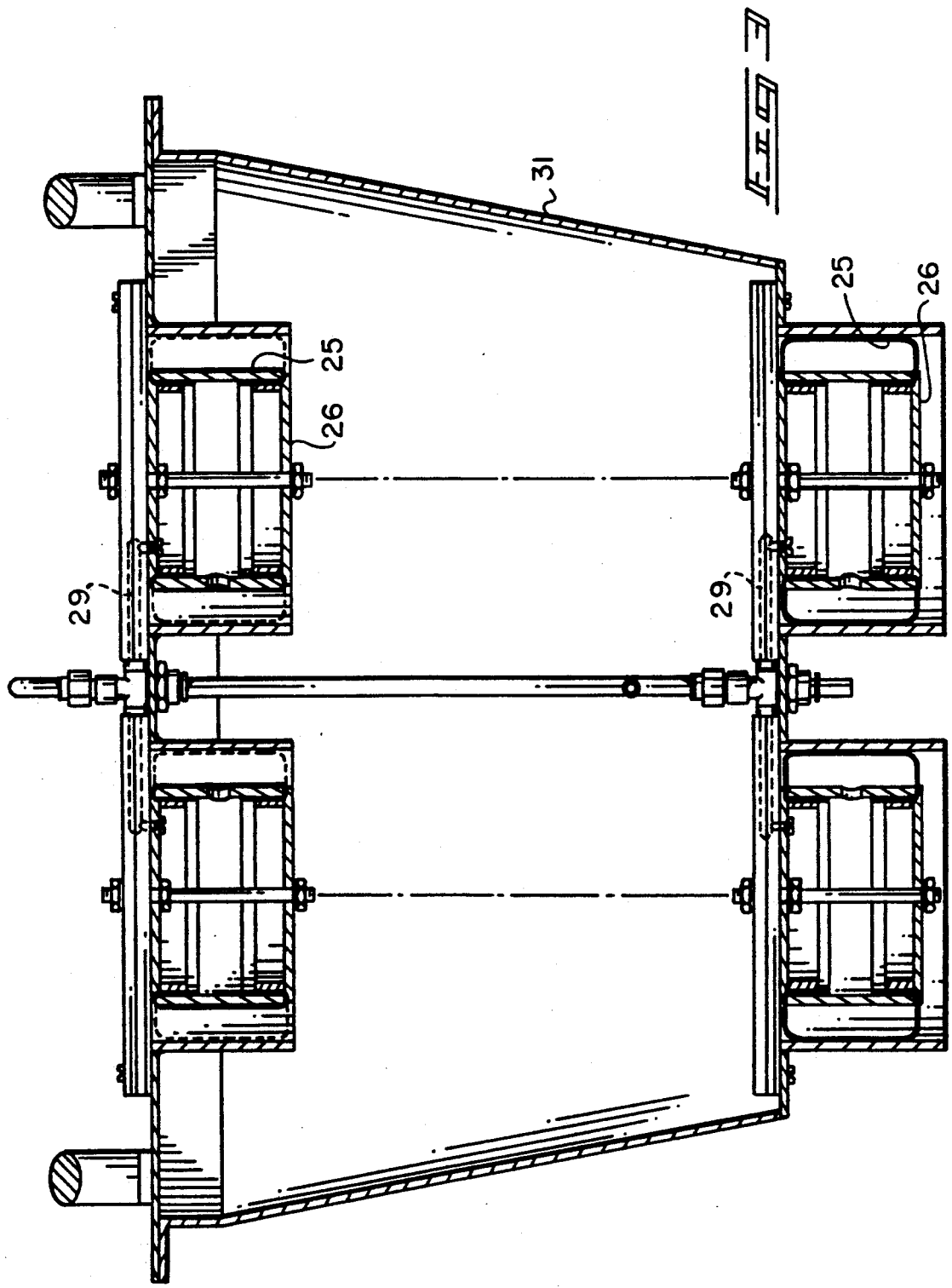

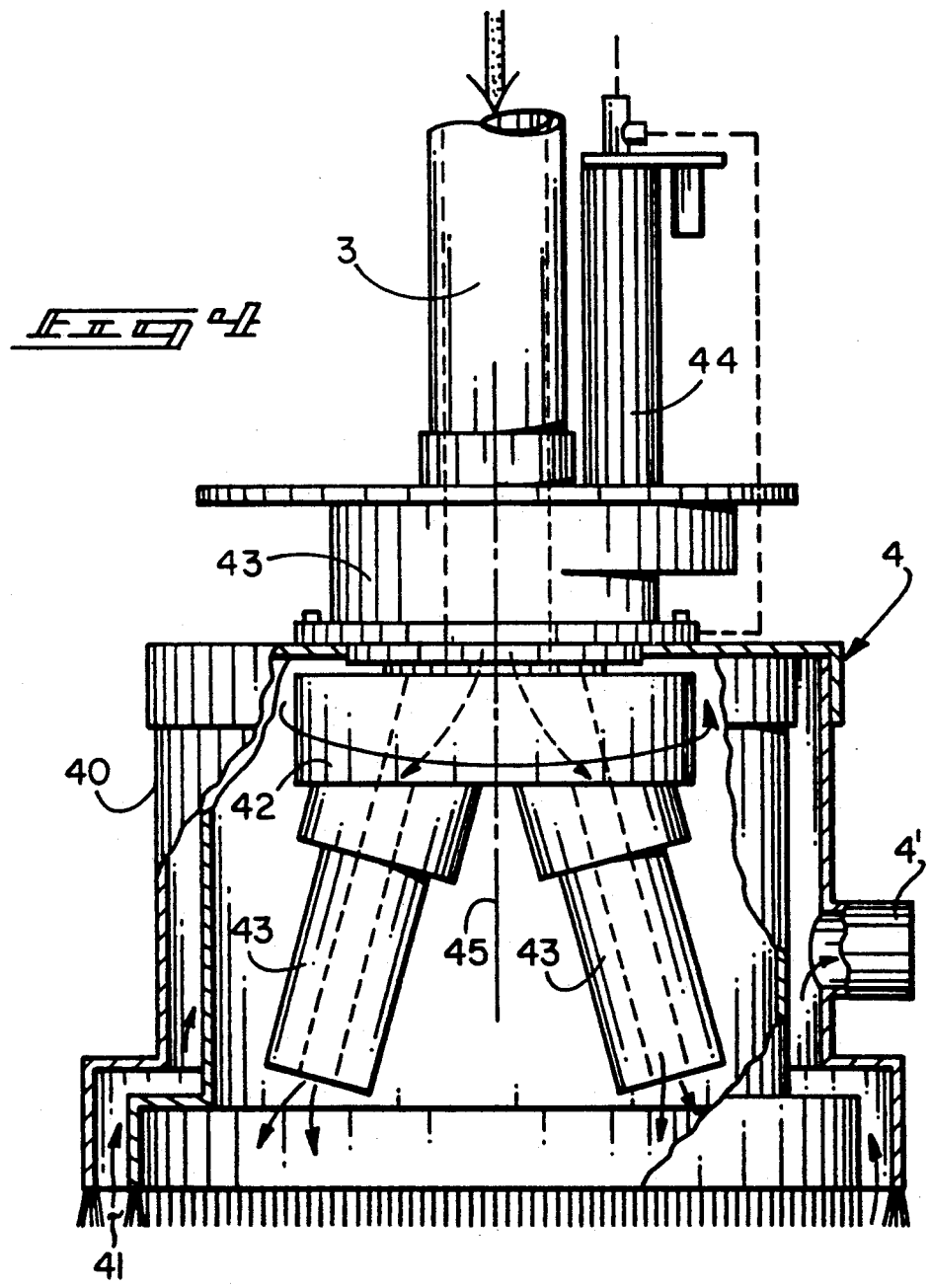

ABRASIVE BLASTING APPARATUS

The invention relates to an apparatus for blasting a surface with granular material, which apparatus consists substantially of a feed tank for the material, a blasting head, a separator device for separating removed dust and granular material, a filter device and a conduit system connecting the tank, the blasting head and the devices, in addition to a vacuum generator arranged behind the filter system for generating a pressure difference over each part of the apparatus.

Such devices of the type described in the preamble are usually used for cleaning surfaces, for instance removing layers of paint in order to be able to treat this surface once again. For this purpose a granular material is blasted onto the surface at high velocity, after collision with which the material is reclaimed together with the removed dust particles in order to be able to re-use the material. To this end the material must be separated from the dust, and the dust discharged from the system. As the capacity of such apparatus increases the pressure difference over the various components of the device become greater, which pressure differences makes difficult the discharge of the dust out of the apparatus and the supply of additional granular material into the apparatus.

The invention has for its object to provide an apparatus of the type described in the preamble, wherein the above mentioned problems are avoided. The apparatus according to the invention is distinguished in that a lock member for feeding dust and/or granular material is arranged in a dividing wall of a device and the surrounding environment.

Due to this lock member it is possible to carry into and out of the system respectively the aggressive, wear causing granular material and/or the removed dust particles without any noteworthy wear occurring. A high vacuum can moreover permanently be maintained in said apparatus with the system of locks.

In the preferred embodiment the lock member is embodied as two bellows located above and at a distance from one another, which are actuated pneumatically. With this system moving parts that are susceptible to wear are restricted to a minimum.

The invention further relates to the blasting head of the apparatus which is provided with at least one blasting nozzle rotating eccentrically around an axis. Due to the rotation of the blasting nozzle a wider area can be blasted than is usual with a fixedly disposed blasting head, which enlarges the capacity of the apparatus.

In a preferred embodiment two blasting nozzles are arranged which are disposed diverging in relation to the axis of rotation.

The invention is further elucidated in the figure description of an embodiment following hereinafter. In the drawing:

FIG. 3 shows a lock member employed with the separator device, indicated with III in FIG. 1.

FIG. 4 shows a standing cross-section of a rotating blasting head according to the invention.

Figure 1:
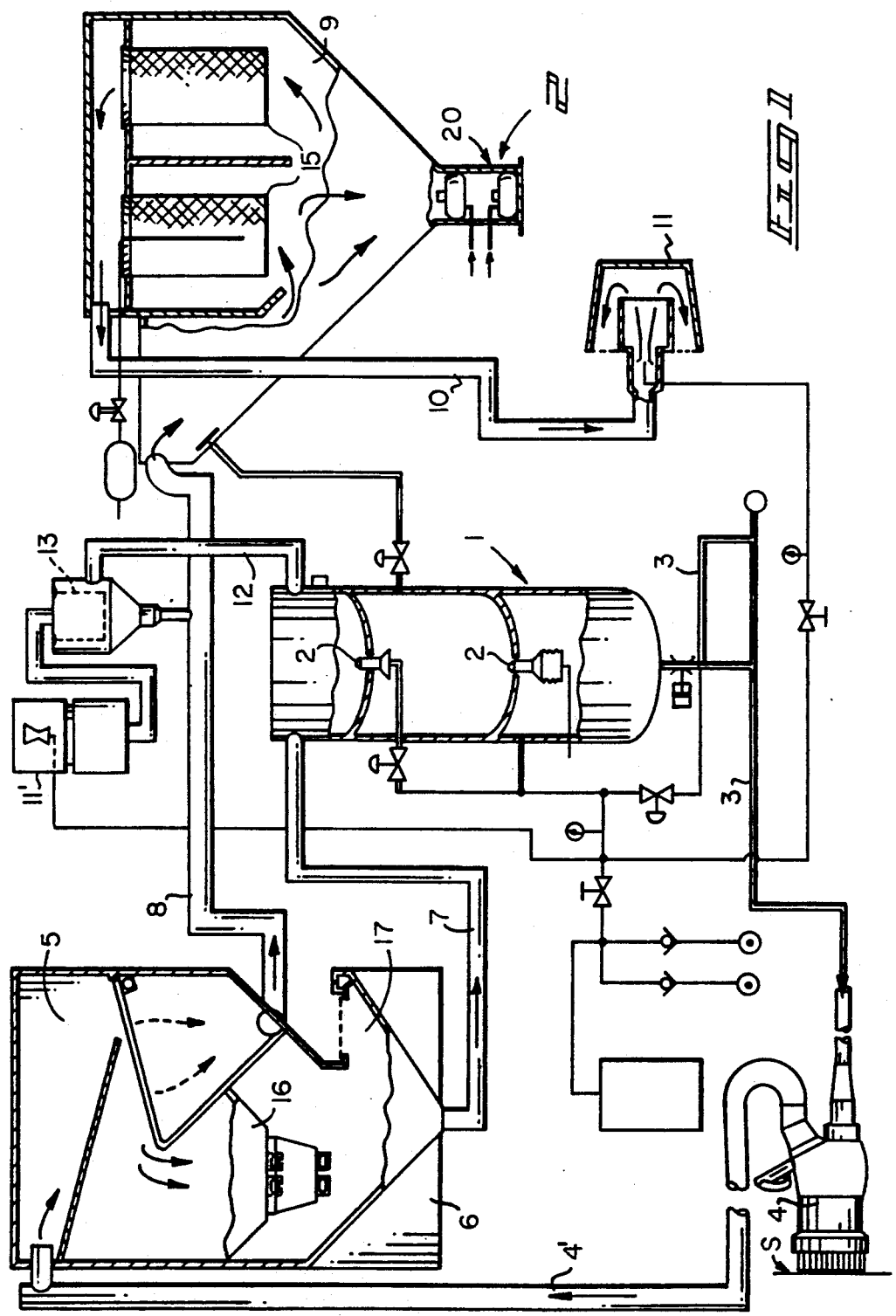
FIG. 1 shows a schematic disposition of the abrasive blasting apparatus according to the invention, provided with two lock members.

The apparatus in FIG. 1 consists substantially of a feed tank 1 for the material, which tank is divided into three compartments, between which compartments are arranged check valves 2. These check valves 2 can be actuated pneumatically or by other means.

The underside of the tank 1 connects to a feed conduit 3 which leads to a blasting head 4. The end of the conduit 3 facing away from the blasting head 4 is in communication with the open air.

A flexible and rigid tube leads from the blasting head to a separator device 5, under which is arranged a collection tank 6. The underside of the collection tank 6 leads via a conduit 7 to the top end of the feed tank 1. The bottom end of the separator device is connected to a transport conduit 8 which leads to a filter device 9. The filter device takes a largely funnel-shaped form, and the top side thereof is connected to a vacuum generator 11 via tube 10.

It is noted that the top side of the feed tank 1 connects via conduit 12 to a cyclone 13, in which an extra dust-/material separation likewise occurs, whereby the underside of the cyclone is connected to the transporting conduit 8.

The operation of the above described apparatus is substantially as follows:

When vacuum is generated by means of the generator 11, an air flow is caused in the conduit system 3, 4', 8, 10 which ensures that the transport of granular material and removed dust particles accumulated at the blasting head 4 will take place. The air flow 3 extracts granular material out of the feed tank 1 and carries it along to the blasting head 4. There the granular material strikes the surface for cleaning S, and is subsequently collected in tube 4' which leads to the separator device, where a separation occurs between granular material and removed dust particles. The dust particles are carried away via conduit 8 to the filter device 9, where the air is discharged via filters 15 and conduit 10 into the surrounding environment. The dust remains behind in the funnel-shaped underside of the filter 9.

The granular material at the separator device 5 remains behind in the collection tank 6, the underside of which connects to a funnel-shaped collection tank 6, with which granular material can be carried back to the top side of the feed tank 1 via conduit 7. Optional additional granular material can be supplied by hand or the like via opening 17. Transporting of granular material takes places as a result of the air flow in conduit line 7, which is generated through the tank 1 which is connected to the underpressure in conduit 7 via the venturi means 11' located to the left of cyclone 13 in FIG. 1, and transmitted through conduit line 12.

Tank 1 is thus provided each time with reclaimed or new material.

The control of the various valves is performed pneumatically and can be of random type.

Figure 2:
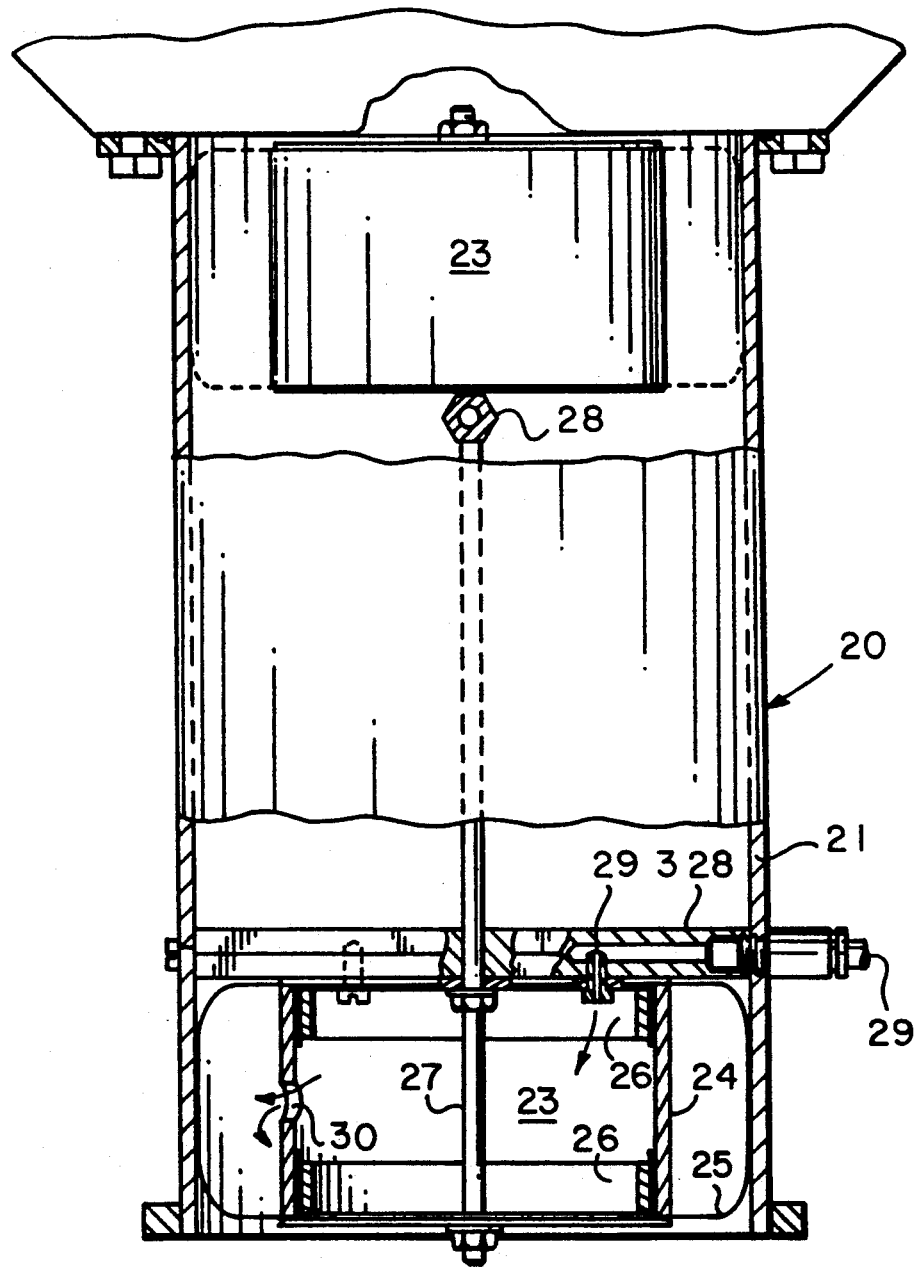
FIG. 2 shows a standing section of a first lock member at the filter device indicated with II.

According to the invention a lock member 20 is arranged on the underside of the funnel-shaped filter housing 9, which lock member is further elucidated in FIG. 2. The lock means consists of a cylindrical housing 21, on the top and bottom side of which a bellows 22 and 23 respectively is accommodated. The bellows consists of a circular, stiff boss part 24 which is provided along the outer periphery with a diaphragm of suitable material 25. The diaphragm is clamped fixedly between flanges 26 and the boss 24. The flanges 26 are mutually connected by a pull rod 27 which runs coaxially with the cylindrical tube wall 21 and simultaneously holds the upper and lower bellows means 23 in place. Arranged transversely of the axial direction of the tubular wall 21 is a feed channel 28 for a pressure medium, which can be supplied via conduit 29. The conduit 28 communicates via throttle nipples 29 with the space between the flanges 26, which communicates via passage 30 with the space between diaphragm 25 and the cylindrical boss 24.

The sending of the pressure medium to the bellows takes place such that in each case one of the bellows is in the closed position, that is, the diaphragm 25 presses against the inner wall of the tubular housing 21. The other bellows can remain open, whereby a through-feed of granular material can take place along the outer side of the diaphragm 25. It will be apparent that when pressure is removed from the upper bellows 23 granular material flows above the lower bellows into the space of the housing 21. After closure of the upper bellows the lower bellows can be vented, whereby the material can be discharged.

With the lock member shown is ensured that relatively large amounts of dust particles can be discharged per charge, whereby the capacity of the total blasting apparatus can be high. The dust particles have a highly abrasive action, which is of little influence with the system of locks shown, because of the co-action of a relatively flexible diaphragm portion which co-operates without sliding with the inner wall of the housing portion 21. Through the absence of an abrasive action, wear is therefore restricted to a minimum. On the other hand it is possible to apply a high vacuum in the filter device 9 because with sufficient pressure in the space of the bellows 25 for setting into operation the abrasive blasting apparatus a sufficient pressure force is realized between diaphragm 25 and the inner wall of housing 21, whereby deformation of the diaphragm 25 during application of a high vacuum in filter device 9 is prevented.

A similar system of locks is arranged in the case of separator device 5 and is further elucidated in FIG. 3. The same reference numerals are used for the same components as those of the embodiment according to FIG. 2. The embodiment according to FIG. 3 is distinguished in that in the housing 31 of a lock member two or more upper bellows are arranged with as many lower bellows. The passage of the lock member can hereby be considerably enlarged.

It will be apparent that actuation of the upper and lower bellows occurs simultaneously, whereby it is remarked that in the position according to FIG. 3 the lower bellows are under pressure, and the upper bellows are pressureless. In the situation shown the upper side of the lock member is connected to the separator device 5, whereby granular material can pass into housing 31. By switching the pressure, that is, placing the upper bellows under pressure and venting the lower bellows, a through-feed of the granular material out of housing 31 into the collection tank 6 takes place.

There now follows a description of the blasting head 4 with reference to FIG. 4. The blasting head shown consists of a housing 40 provided with a double wall, whereby the outer wall is in connection with the conduit 4' and whereby on the underside the inner and outer wall serve to support a brush 41. Arranged in the housing is a carrier 42 on which two blasting nozzles 43 are fixed. The carrier 42 is bearing mounted in a holder 43 which is fixedly attached to the top side of the housing 40. The holder 43 is connected on the top side to the feed conduit 3 of the apparatus.

The holder 43 is embodied as gearbox, this such that the toothed wheels accommodated therein are connected on the one side to the rotating carrier 42 and on the other side to an air motor 44, which is fixed on top of the holder 43.

The blasting nozzles 43 rotate about the centre line 45 of the holder 43 and furthermore enclose an angle therewith such that the blasting nozzles diverge. It will be apparent that as a result of the rotation and the diverging away from one another of the blasting nozzles 43 the granular material can be carried over a large area of the surface S for cleaning. The diameter of the passage of each blasting nozzle here remains such however that a sufficient velocity of the air flow and the granular material is maintained, whereby a good cleaning capacity is ensured.

The granular material is discharged via brush 41 via the double wall of the housing 40 to the discharge conduit 4'.

The invention is not limited to the above described embodiments.

What is claimed is:

1. An abrasive blasting apparatus for blasting a surface with an abrasive granular material, the apparatus comprising:
   a feed tank for said abrasive granular material;
   a blasting head;
   a separator device for separating said granular material from dust removed from the surface;
   a filter device;
   an air and granular material transporting conduit system forming a circuit connecting said tank, blasting head, separator, and filter, for directing flow of air and granule material through said circuit;
   a vacuum generator means connected to the conduit system for producing a current of air to carry granular material through said circuit at a differential operating pressure within the circuit relative to surrounding atmospheric pressure; and
   lock means connected in said circuit enabling selective access to granular material and dust collected within the differentially pressurized circuit from the surrounding atmosphere without adversely affecting the differential pressure within the circuit; and
   wherein the lock means is comprised of at least two separately controllable bellows spaced apart from one another within a tubular pressure wall, said wall having one end opening into the circuit and another end opening into the surrounding atmosphere to provide said access to the surrounding atmosphere.

2. The apparatus as claimed by claim 1, wherein the two separately controllable bellows are spaced elevationally one from one another within the tubular pressure wall to form a space between the circuit and the end of the tubular pressure wall opening into the surrounding atmosphere.

3. The apparatus as claimed by claim 1 wherein the blasting head includes a housing and at least one blasting nozzle and means mounting the nozzle in the housing for rotation eccentrically around an axis.

4. The apparatus as claimed in claim 1 wherein the blasting head includes at least two blasting nozzles disposed in diverging relation to an axis.

5. An abrasive blasting apparatus for blasting a surface with an abrasive granular material, the apparatus comprising:

a conduit system for enclosing and directing air and granular material flow under differential pressure in relation to surrounding atmospheric pressure;

a feed tank connected to the conduit system for receiving said abrasive granular material;

a blasting head connected to the conduit system to receive air flow and granular material therethrough and adapted to direct the granular material against a surface and to return the granule material and dust removed from the surface to the conduit system;

a separator device connected to the conduit system for receiving and separating said granular material from said dust removed from the surface;

a collection tank situated under the separator device for receiving separated granular material from the separator device;

an opening in the collection tank communicating between the collection tank and the surrounding atmosphere and permitting access to granular materials collected within the collection tank;

first lock means situated between the separator device and collection tank for enabling through flow of granular material from the separator tank to the collection tank without significantly altering the pressure differential between the circuit and the surrounding atmosphere;

the conduit system including a conduit leading from the collection tank to the feed tank for recycling granular material to the feed tank from the collection tank;

a filter device;

the conduit system further including a transport conduit leading from the separator device to the filter device for including the filter device in the differentially pressurized circuit and for delivering dust received within the separator device to the filter device;

wherein the filter device includes a funnel shape leading to a bottom end for guiding collected dust downwardly;

second lock means situated between the filter device and the surrounding atmosphere for enabling through flow of granular material from the filter device to the surrounding atmosphere without significantly altering the pressure differential between the circuit and the surrounding atmosphere; and a vacuum generator means connected to the conduit system for producing said airflow to carry granular material through said circuit at an operating pressure different than the surrounding atmospheric pressure.

6. The apparatus as claimed by claim 5 wherein the blasting head includes a housing and at least one blasting nozzle and means mounting the nozzle to the housing for rotation eccentrically around an axis.

7. The apparatus as claimed by claim 5 wherein the blasting head includes at least two blasting nozzles disposed in diverging relation to an axis.

8. The apparatus as claimed by claim 5 wherein the blasting head includes a housing and at least two blasting nozzles disposed in diverging relation to an axis and means mounting the nozzles to the housing for rotation eccentrically around an axis.

9. The apparatus as claimed by claim 5, wherein the first lock means is comprised of at least two separately controllable bellows within a vertical pressure wall and spaced elevationally therein from one another to form a space between the separator device and the collection tank.

10. The apparatus as claimed by claim 5, wherein the second lock means is comprised of at least two separately controllable bellows spaced elevationally one from another within a circular vertical pressure well having one end opening into the filter device and another end opening to the surrounding atmosphere.

* * * * *